United States Patent Office 3,376,496
Patented Apr. 2, 1968

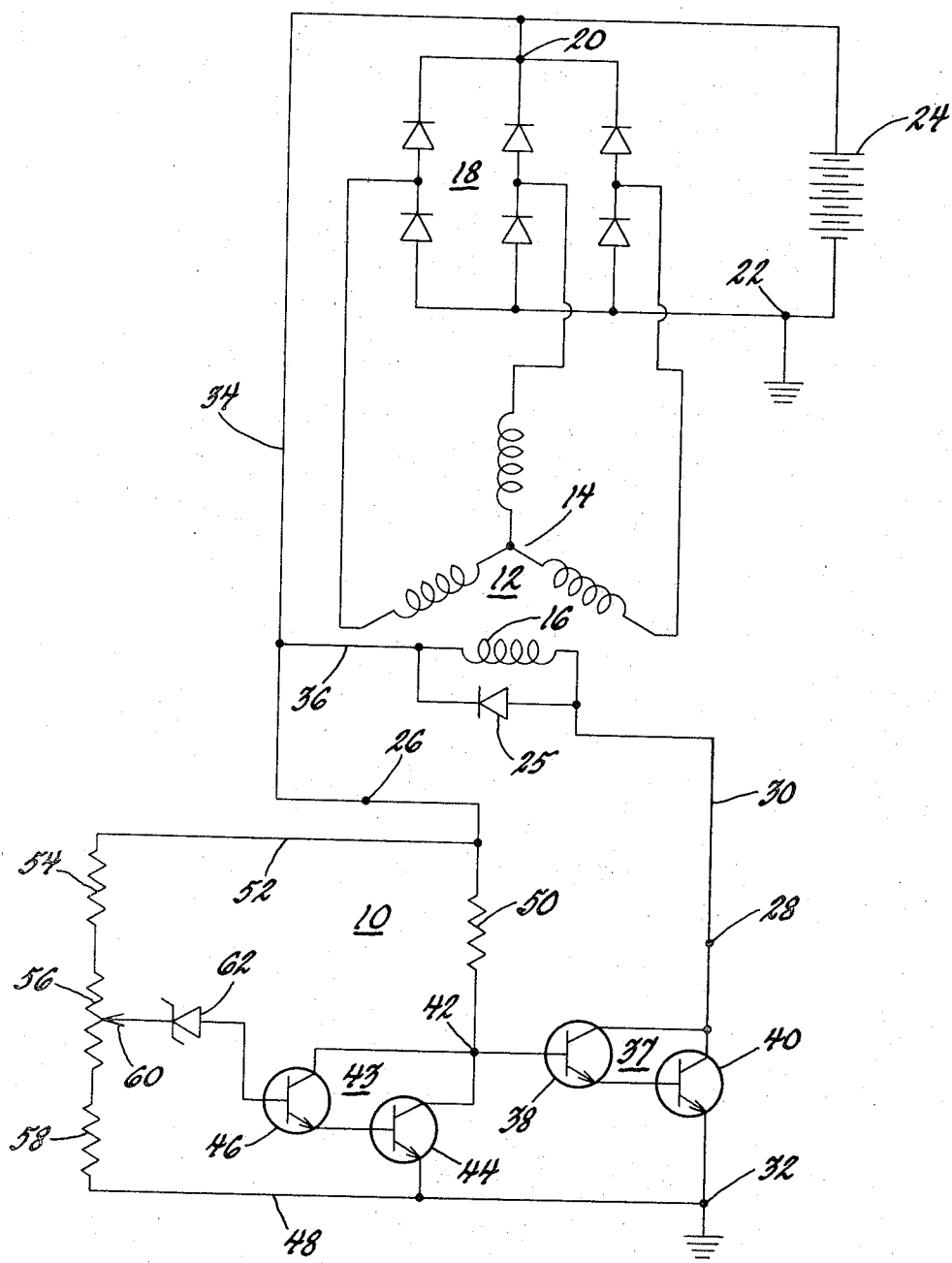

3,376,496
VOLTAGE REGULATOR
Johan Lund and Ronald R. Mitchell, Kokomo, Ind., assignors to General Motors Corporation, Detroit, Mich., a corporation of Delaware
Filed Sept. 15, 1965, Ser. No. 487,502
2 Claims. (Cl. 322—28)

ABSTRACT OF THE DISCLOSURE

This invention relates to a transistor voltage regulator for regulating the output voltage of a generator and more particularly to a regulator for regulating generators of the type used to supply the electrical loads on a motor vehicle. The regulator is arranged so that it can be easily fabricated from one or more monolithic silicon blocks to provide an integrated voltage regulator of small size. The regulator has a relatively high input impedance and utilizes transistor switching circuits one of which is connected with the field of the generator and the other of which responds to the output voltage of the generator.

---

This invention relates to a transistor voltage regulator and more particularly to a transistor voltage regulator which is capable of regulating the output voltage of a generator.

The use of transistor voltage regulators to regulate the output voltage of a generator is known and is shown in the patent to Short, Re. 24,715.

One of the objects of this invention is to provide a transistor voltage regulator that is capable of regulating the output voltage of the generator such as that illustrated in the above mentioned Short patent but wherein the circuit is arranged such that it can be fabricated entirely by the use of one or more monolithic silicon blocks to provide an integrated voltage regulator of small size.

In fabricating integrated circuits, it is desirable that the circuit not have any large capacitances and it therefore is another object of this invention to provide a transistor voltage regulator for generators which does not employ large filter capacitors.

Another object of this invention is to provide a voltage regulator for a generator that has a high input impedance and which employs a semiconductor breakdown device that has a sharp knee at its breakdown point. In carrying this object forward, the circuit component having the predetermined breakdown voltage preferably has the characteristic of the emitter-base junction of a planar transistor.

Further objects and advantages of the present invention will be apparent from the following description, reference being had to the accompanying drawing wherein a preferred embodiment of the present invention is clearly shown.

The single figure drawing is a schematic circuit diagram of a voltage regulator made in accordance with this invention shown connected with a diode-rectified alternating current generator.

Referring now to the drawing, the reference numeral 10 generally designates a voltage regulator made in accordance with this invention which is adapted to regulate the output voltage of a generator having a field winding. Although the generator 12 can take a wide variety of forms, it is illustrated in the drawing as an alternating current generator having a three phase Y-connected output winding 14 and a field winding 16. The output winding 14 is connected with a three phase full wave bridge rectifier 18 which can be made up of six silicon diodes. The bridge rectifier 18 has a positive direct current output terminal 20 and a negative direct current output terminal 22. The output terminals 20 and 22 can be used to feed various loads on a motor vehicle, for example, the battery 24 which is connected to receive charging current from the bridge rectifier 18. The field winding 16 is shunted by a diode 25 which is external of the voltage regulator 10.

The voltage regulator 10 maintains the output voltage of the diode rectified alternating current generator substantially constant over various speed ranges and load ranges of the motor vehicle. In motor vehicle applications, the generator is driven by the engine of the motor vehicle and therefore operates through a widely varying speed range. In addition, the load connected with the generator is varied in accordance with the load requirement imposed upon the system when various motor vehicle loads are energized.

The voltage regulator 10 has an input terminal 26 which is adapted to be connected to the positive output terminal of the direct current power generating means. This regulator has a field terminal 28 which is connected to one side of the field winding 16 of the generator 12 through a conductor 30. The voltage regulator 10 has another input terminal 32 which is connected with the negative side of the diode-rectified alternating current generator. The positive input terminal 26 of the voltage regulator is connected with the positive side of the bridge rectifier 18 by a conductor 34 and it is seen that the conductor 34 also is connected to one side of the field winding 16 by a conductor 36.

The transistor voltage regulator 10 is preferably fabricated as an integrated circuit and includes a first generator switching circuit 37 comprised of a pair of NPN transistors 38 and 40. The emitter of transistor 38 is connected with the base of transistor 40 and the collector-emitter circuit of transistor 40 is connected between the input terminal 28 and input terminal 32. The collector of transistor 40 is connected with the collector of transistor 38 and the base of transistor 38 is connected with a junction 42.

The transistor switching circuit 37 is well adapted to be fabricated by an integrated circuit technique since the common collector connection can be a common block of N-type material and the emitter-base junctions are readily fabricated.

The transistor regulator 10 includes a second transistor switching circuit 43 comprised of a pair of NPN transistors 44 and 46. The collector-emitter circuit of transistor 44 is connected between junction 42 and grounded conductor 48. The collectors of transistors 44 and 46 are connected together and to junction 42 and the emitter of transistor 46 is connected with the base of transistor 44. A resistor 50 connects junction 42 and conductor 52.

A voltage divider comprised of resistors 54, 56 and 58, is connected across conductors 52 and 48 and serves to develop a voltage which is proportional to the output voltage of the diode rectified alternating current generator. The resistor 56 is a variable resistor having a shiftable tap 60 which can be adjusted to vary the voltage developed between tap 60 and the conductor 48.

The base of transistor 46 is connected with the tap 60 through a PN junction semiconductor device 62 having a predetermined breakdown voltage. The device 62 is a Zener diode, which preferably has the same characteristics as the emitter-base junction of a planar transistor. This device has a very low leakage current in a reverse direction and has a sharp knee in its voltage-current characteristic at the breakdown point of the semiconductor. As one example, the breakdown characteristic of the semiconductor 62 in a reverse direction can be substantially the same as that of the emitter-base junction of a 2N2711 planar transistor.

In operation of the voltage regulator, the field 16 will be energized whenever the transistor 40 is conductive in its collector-emitter circuit. This circuit for energizing field 16 can be traced from terminal 20 through conductor 34, through conductor 36, through field winding 16, through conductor 30, through input terminal 28 and then through the collector-emitter circuit of transistor 40 to the opposite side of bridge rectifier 18.

When the output voltage of the power unit which appears between conductors 52 and 48 is below the desired regulated value, the transistor 40 is switched on so that field current is supplied to the field winding 16 to increase the output voltage of the generator 12. Under this condition, the semiconductor device 62 is not conducting in a reverse direction and transistor 38 is biased conductive so that current flows through the field winding 16.

When the output voltage of the diode rectified alternating current generator rises above the desired regulated value, the semiconductor device 62 will break down in a reverse direction which will cause current to flow in the base-emitter circuits of transistors 46 and 44. This will cause the transistor 44 to turn on which connects the resistor 50 across conductors 52 and 48. The voltage developed across resistor 50 drives the junction 42 negative which results in the transistors 38 and 40 being biased to a nonconductive condition. When transistor 40 switches to a nonconductive condition, the circuit for field winding 16 is substantially opened to reduce current flow through the field winding and therefore reduce the output voltage of the generator 12.

From the foregoing it will be apparent that the output transistor 40 switches on and off depending upon the voltage appearing between conductors 52 and 48 to maintain a current flow through the field winding 16 which holds the output voltage of the generator 12 substantially constant through a varying load and speed range.

By way of example and not by way of limitation, the various circuit components of the voltage regulator 10 may have the following values:

| | |
|---|---|
| Transistors 38 and 40 | Type 2N4222 |
| Transistors 46 and 44 | Type 2N2711 |
| Zener diode 62 [1] | |
| Resistor 50 ohm | 1K |
| Resistor 54 do | 33K |
| Resistor 56 do | 100K |
| Resistor 58 do | 200K |

[1] Emitter-base junction of a 2N2711 planar transistor.

Although specific characteristics of transistors have been given in the above chart, it is to be understood that these are only given as characteristics of transistors that are fabricated on one or more monolithic silicon blocks.

The transistor regulator of this invention has a relatively high input impedance and does not require filter capacitors. Because of this high input impedance the ripple component of the output voltage of the alternator has a negligible effect on the voltage regulator 10.

While the embodiment of the present invention as herein disclosed, constitutes a preferred form, it is to be understood that other forms might be adopted.

What is claimed is as follows:

1. An electrical system comprising, a source of direct current including an alternating current generator having an output winding and a field winding, said source of direct current including rectifier means having positive and negative direct current power supply terminals coupled to said output winding, a voltage regulator for maintaining the output voltage of said source of direct current substantially constant, said voltage regulator including a first switching circuit comprised of first and second NPN transistors, means connecting the collectors of said first and second NPN transistors with each other, means connecting the emitter of said second NPN transistor directly with the base of said first NPN transistor, means connecting one side of said field winding with the positive side of said source of direct current, means connecting the opposite side of said field winding with the common connection of the collectors of said first and second transistors, means connecting the emitter electrode of said first transistor directly with said negative terminal of said source of direct current, a second switching circuit comprised of third and fourth NPN transistors, means connecting the collectors of said third and fourth NPN transistors together and to a junction, means connecting said junction with the base of said second NPN transistor, a resistor connected between said positive direct current output terminal and said junction, means connecting the emitter of said third transistor directly to said negative direct current output terminal, a voltage divider of relatively high resistance connected across said positive and negative direct current output terminals and a Zener diode connected between said voltage divider and the base of said fourth NPN transistor.

2. An electrical system comprising, a source of direct current including an alternating current generator having an output winding and a field winding, said source of direct current including rectifier means having first and second direct current output terminals coupled to said output winding, a voltage regulator for maintaining the output voltage of said generator substantially constant, said voltage regulator including a voltage divider connected across said direct current output terminals, said voltage divider having a relatively high resistance to provide a high input impedance for said regulator, a first switching circuit including first and second NPN transistors and a Zener diode, means connecting the collectors of said first and second transistors together and to a junction, a resistor connected between said junction and said first direct current output terminal, means connecting the emitter of said first transistor directly to the base of said second transistor, means connecting the emitter of said second transistor directly to said second direct current output terminal, a Zener diode connected between a point on said voltage divider and the base of said first transistor, said Zener diode and the base-emitter junctions of said first and second transistors being connected in series between said point on said voltage divider and said second direct current output terminal, a second transistor switching circuit including at least one other NPN power output transistor, means connecting said field winding between said first direct current output terminal and the collector of said power output transistor, means connecting the emitter of said power output transistor directly with said second direct current output terminal and means coupling said junction with the base of said power output transistor whereby said power output transistor is switched substantially fully conductive when said first switching circuit is substantially nonconductive and vice versa.

References Cited
UNITED STATES PATENTS

| | | | |
|---|---|---|---|
| Re. 24,715 | 10/1959 | Short | 322—28 X |
| 3,136,940 | 6/1964 | Carlson | 322—28 X |
| 3,293,536 | 12/1966 | Byles | 322—28 |

MILTON O. HIRSHFIELD, *Primary Examiner.*

J. D. TRAMMELL, *Assistant Examiner.*